(12) United States Patent
Sankar et al.

(10) Patent No.: US 11,429,987 B2
(45) Date of Patent: Aug. 30, 2022

(54) DATA-DRIVEN METHOD AND SYSTEM TO FORECAST DEMAND FOR MOBILITY UNITS IN A PREDETERMINED AREA BASED ON USER GROUP PREFERENCES

(71) Applicant: Volvo Car Corporation, Gothenburg (SE)

(72) Inventors: Krishna Sankar, Mountain View, CA (US); Vedad Cajic, Mountain View, CA (US); Usha Nookala, Mountain View, CA (US); Jonas Fenn, Mountain View, CA (US)

(73) Assignee: Volvo Car Corporation, Gothenburg (SE)

( * ) Notice: Subject to any disclaimer, the term of this patent is extended or adjusted under 35 U.S.C. 154(b) by 235 days.

(21) Appl. No.: 16/120,561

(22) Filed: Sep. 4, 2018

(65) Prior Publication Data

US 2019/0347674 A1    Nov. 14, 2019

Related U.S. Application Data

(60) Provisional application No. 62/668,943, filed on May 9, 2018.

(51) Int. Cl.
*G06Q 10/00* (2012.01)
*G06Q 50/00* (2012.01)
*G06Q 30/02* (2012.01)

(52) U.S. Cl.
CPC ..... *G06Q 30/0202* (2013.01); *G06Q 30/0205* (2013.01)

(58) Field of Classification Search
CPC ...................................................... G06Q 10/02
See application file for complete search history.

(56) References Cited

U.S. PATENT DOCUMENTS

| | | | |
|---|---|---|---|
| 6,317,720 B1 | 11/2001 | Murakami et al. | |
| 9,953,539 B1* | 4/2018 | Gkiotsalitis ............. | G06N 5/04 |
| 2002/0019760 A1 | 2/2002 | Murakami et al. | |
| 2010/0185486 A1 | 7/2010 | Barker et al. | |
| 2013/0144831 A1 | 6/2013 | Atlas | |
| 2015/0186792 A1 | 7/2015 | Chidlovskii | |

(Continued)

FOREIGN PATENT DOCUMENTS

| | | |
|---|---|---|
| CN | 104766193 A | 7/2015 |
| EP | 2506193 A1 | 10/2012 |

(Continued)

OTHER PUBLICATIONS

Jun. 13, 2019 European Search Report issue on International Application No. EP19171255.

*Primary Examiner* — Hafiz A Kassim
*Assistant Examiner* — Matheus Ribeiro Stivaletti
(74) *Attorney, Agent, or Firm* — Clements Bernard Walker; Christopher L. Bernard (57) ABSTRACT

Predicting transportation demand in a predetermined area, based on estimating a present mobility demand and based on user group preferences. Generated transportation need requests include at least a time stamp, a pick-up coordinate, a drop-off coordinate, a user group indication, a pick-up venue category based on the pick-up coordinate, and a drop-off venue category based on the drop-off coordinate. A signal indicative of the transportation need request is provided.

17 Claims, 10 Drawing Sheets

(56) References Cited

U.S. PATENT DOCUMENTS

| | | |
|---|---|---|
| 2016/0209220 A1* | 7/2016 | Laetz ..................... G08G 1/202 |
| 2016/0225262 A1 | 8/2016 | Edakunni et al. |
| 2016/0246792 A1* | 8/2016 | Anguiano ........... G06F 16/9537 |
| 2016/0353249 A1* | 12/2016 | Khatam ................... H04Q 3/64 |
| 2017/0024531 A1* | 1/2017 | Malaviya ............... G16H 40/20 |
| 2017/0032248 A1* | 2/2017 | Dotan-Cohen ....... H04L 67/306 |
| 2017/0109764 A1 | 4/2017 | Tripathi et al. |
| 2017/0351955 A1 | 12/2017 | Fletcher |
| 2018/0033058 A1* | 2/2018 | Mukherjee ............ H04L 67/306 |
| 2018/0096606 A1 | 4/2018 | Moreira-Matias et al. |
| 2018/0156621 A1* | 6/2018 | Suzuki ................... G06Q 10/02 |
| 2018/0164959 A1* | 6/2018 | Gupta ................. G06Q 10/109 |
| 2018/0315139 A1* | 11/2018 | O'Herlihy .............. G06Q 50/14 |
| 2018/0342035 A1* | 11/2018 | Sweeney ................ G08G 1/202 |
| 2019/0004875 A1* | 1/2019 | Ofer ........................ G06F 9/542 |
| 2019/0050758 A1* | 2/2019 | Kyllmann ............ G06Q 10/047 |
| 2019/0196503 A1* | 6/2019 | Abari ................... G06Q 10/063 |
| 2019/0213513 A1* | 7/2019 | Seacat ................... G06Q 20/102 |
| 2019/0312778 A1* | 10/2019 | Netanel ............... H04L 41/0823 |
| 2020/0005206 A1* | 1/2020 | van Ryzin ....... G06Q 10/06311 |
| 2020/0082315 A1* | 3/2020 | Crapis ............. G06Q 10/06311 |

FOREIGN PATENT DOCUMENTS

| | | |
|---|---|---|
| JP | 2015122108 A | 7/2015 |
| WO | 2010123075 A1 | 10/2010 |
| WO | 2017148202 A1 | 9/2017 |

* cited by examiner

| Time Stamp (HOUR, DAY) | USER GROUP | ACTIVITY PREFERENCE SCORE | REGION ID |
|---|---|---|---|
| 21.00 P.M, SAT | UG1 | { home: 0.01; night life spot: 0.03; food: 0.2; ...... n:} | 32 |
| | UG2 | { home: 0.04; night life spot: 0.07; food: 0.6; ...... n:} | |
| | UG3 | { home: 0.1; night life spot: 0.3; food: 0.12; ...... n:} | |
| | UGn | { home: 0.11; night life spot: 0.63; food: 0.2; ...... n:} | |

| Timestamp | Pick up GPS coordinates | Drop off GPS coordinates | User Group | Pick up venue category |
|---|---|---|---|---|
| | | | | |
| | | | | |

| Pick up coordinates | Drop off coordinates | User GRP | Transportation mode options | Travel Attribute |
|---|---|---|---|---|
| (32, -12) | (32, -12.59) | UG1 | Tram Service X | {Price: x dollars, eco-friendly score: 1.0, incentives: No, Safety Score: 0.8 ... N attribute score : n} |
| | | | Car Sharing Service A | {Price: x dollars, eco-friendly score: 1.0, incentives: Flat rates, Safety Score: 0.8 ... N attribute score : n} |
| | | | Car Sharing Service B | {Price: x dollars, eco-friendly score: 1.0, incentives: NO, Safety Score: 0.8 ... N attribute score : n} |
| | | | Bike Sharing Service D | {Price: x dollars, eco-friendly score: 1.0, incentives: gift card from a sports store, Safety Score: 0.8 ... N attribute score : n} |
| ⋮ | ⋮ | ⋮ | ⋮ | ⋮ |
| ⋮ | ⋮ | ⋮ | ⋮ | ⋮ |

| Region ID | User Groups (UGs) | Travel Attribute - Preference Scores |
|---|---|---|
| 31 | UG1 | { price range : x1-x2 USD ; preferred brand of services : {a,b,c,d..} ; eco-friendly score : 0.2 ; incentives: 0.9 ; Safety preference Score: 1.0 ... Nth attribute score : n} |
| | UG2 | { price range : x4-x5 USD ; preferred brand of services : {e,f,d..} ; eco-friendly score : 0.4; incentives: 0.3 ; Safety preference Score: 0.4 ... Nth attribute score : n} |
| | ⋮ | ⋮ |
| | UGn | { price range : x1-x4 USD ; preferred brand of services : {a,b,e,f..} ; eco-friendly score : 0.3 ; incentives: 0.75 ; Safety preference Score: 0.3... Nth attribute score : n} |

*Fig. 7*

| Timestamp | Pick up coordinates | Drop off coordinates | User Group | Travel/Commute options | Acceptance Score |
|---|---|---|---|---|---|
| 18:01:11 23/10/2017 | (32.010,-12.546) | (32.010,-12.343) | UG1 | Tram Service X | 0.2 |
| | | | | Car Sharing Service A | 0.5 |
| | | | | Car Sharing Service B | 0.2 |
| | | | | Bike Sharing Service D | 0.1 |

DATA-DRIVEN METHOD AND SYSTEM TO FORECAST DEMAND FOR MOBILITY UNITS IN A PREDETERMINED AREA BASED ON USER GROUP PREFERENCES

CROSS-REFERENCE TO RELATED APPLICATION

The present patent application/patent claims the benefit of priority of U.S. Provisional Patent Application No. 62/668,943, filed on May 9, 2018, and entitled "A DATA-DRIVEN METHOD AND SYSTEM TO FORECAST DEMAND FOR MOBILITY UNITS IN A PREDETERMINED AREA BASED ON USER GROUP PREFERENCES," the contents of which are incorporated in full by reference herein.

FIELD OF THE INVENTION

The present invention relates to a method and a system for predicting transportation demand in a predetermined area.

BACKGROUND OF THE INVENTION

In recent years, human-assisted self-driving vehicles and fully autonomous vehicles have received more attention. An autonomous vehicle may be able to navigate a trip through a city without any active interference by a human operator.

An autonomous vehicle requires relatively complicated programming and machine learning algorithms to be able to make fast and accurate decisions in real-time. In human-assisted self-driving vehicles, there is still a human operator to control the vehicle in some critical situations.

For a group of autonomous vehicles to drive in an area, such as a city, and avoid collisions, it may be perceived that they share information between each other, such as their location, speed, travelling direction, etc. The vehicles may also be equipped with proximity sensors and cameras for identifying obstacles and objects near the vehicle. Accordingly, for travelling through the city, the vehicles may identify and avoid objects near the vehicle as well as plan its route by knowledge about other vehicles near the vehicle.

By the introduction of autonomous vehicles or human-assisted self-driving vehicles, transportation for people and also delivery services may be provided by fleets of self-driving vehicles. The driving control of autonomous vehicles in controlled traffic environments is becoming well explored, however, over a large scale, such as an entire city, it is of interest how to distribute the vehicles, or other service units, across the city in the most efficient way. In particular, it is of interest to be able to distribute the vehicles according to demand from customers.

Accordingly, there is a need for ways of distributing of service units across areas, such as to meet a service demand from users in the city.

SUMMARY OF THE INVENTION

In view of the above, it is an object of the present invention to provide an improved method for predicting mobility demand in a predetermined geographical area.

According to a first aspect of the invention, there is provided a method for predicting transportation demand in a predetermined area, the method includes the steps of: estimating a present mobility demand indicative of the estimated number of pick-up demands at a present time stamp for each of a set of regions within the predetermined area based on modelling of past estimated mobility demand, determining a set of activity preference scores indicative of the distribution of preferred activities at the present time stamp for each user group in a set of user groups, each region having an associated set of user groups, generating a query for a pick-up coordinate for each of the preferred activities, and a drop-off coordinate query for coordinates related to the preferred activities, for each user group and their respective region, based on the query and a stored set of coordinates for user groups and activities, determining a list of possible pick-up coordinate and drop-off coordinate combinations, generating a number of transportation need requests based on the list of possible pick-up coordinate and drop-off coordinate combinations, and the estimated number of pick-up demands, each transportation need request including a time stamp, a pick-up coordinate, a drop-off coordinate, a user group indication, a pick-up venue category based on the pick-up coordinate, and a drop-off venue category based on the drop-off coordinate, and providing a signal indicative of the transportation need requests.

The present invention is based on the realization to include different user groups mobility demands and their preferred activities at different times in order to more accurately predict a mobility demand in a predetermined area. Accordingly, with the inventive concept, not only may the number of transportation needs be taken into account, but also behavioral trends among identified user groups. Thus, for a given user group and region in the predetermined area, the inventive concept may capture mobility demand variations, thereby gaining insights on various travel preferences as they evolve in both spatial and temporal domains.

The present invention may advantageously be used for city planning, OEMs in automotive industry, public transportation planning, and on-demand mobility services for driving their business decisions or integrate it to primitive collaborative decision making systems. Moreover, the present invention enables a more efficient distribution of mobility units in a predetermine area by being able to predict the mobility demand in the predetermined area.

The set of regions are parts of the predetermined area. For example, if the predetermined are is a city, the regions a sub-areas of the city. The regions may be defined by polygons and may be arbitrarily user-defined, or based on e.g. taxi zones or zip codes.

Modelling of past estimated mobility demand for forecasting the present mobility demand may be performed based on deep learning architectures and trained on historical transportation data and context data. The historical data may data logged in a database related to transportation using cars, taxis, trams, bikes, etc., weather, events, day of the week etc.

Determining a set of activity preference scores includes, in a weighted manner, describing what activities different user groups at a given region prefer to do at a certain time stamp. A time stamp may include a time and a day. The day may include which weekday, but also which date which thus takes into account seasonal changes in the preferred activities. A time stamp may include a time in the format Hour: Minute: Second.

The pick-up coordinate query for each of the preferred activities indicates where (i.e. a coordinate) it is likely to pick-up a user interested in a specific activity. For instance, a pick-up coordinate where a user who is interested in eating at an Italian restaurant is likely to be picked up.

Relating to the above example, the drop-off coordinate is consequently a coordinate where it is possible to find an Italian restaurant. A contextual map database has record of contextual data for the predetermined area including tags for every GPS coordinate on existing map services with attributes such as the venue category, and user-group presence at a given GPS coordinate.

A list of possible pick-up coordinate and drop-off coordinate combinations may be formed by mapping the possible pick-up coordinate and drop-off coordinate combinations to stored coordinates of user group locations and preferred activities. From this and the estimated mobility demand, it is possible to generated a number of transportation need requests.

A venue category may be e.g. shopping malls, restaurants, grocery stores, nightlife spots, offices, residence, stadiums, theatres, parks, banks, etc.

A "coordinate" may be a GPS coordinate.

The signal including the transportation need request may be provided to a self learning platform for learning policies which may subsequently be used for distributing mobility units in the predetermined area.

Selecting the estimated number of transportation need requests from the list of possible pick-up coordinate and drop-off coordinate combinations may be based on randomly selecting the estimated number of pick-up coordinate and drop-off coordinate combinations from the list. In other words, each pick-up coordinate and drop-off coordinate combination may have equal probability to be selected from the list for generating transportation need request.

In some embodiments, selecting the estimated number of transportation need requests from the list of possible pick-up coordinate and drop-off coordinate combinations may be based on weighted sampling of the estimated number of pick-up coordinate and drop-off coordinate combinations from the list. Accordingly, weighted sampling may be used for ensuring that under-represented venues and user groups are still sufficiently represented in the generation of transportation need requests. For instance, a movie theatre A is more popular than B, in this case most pick-up coordinates might be generated to place A unless weighed sampling gave more weight to place B.

According to some embodiments, the method may include calculating adaptation factors for a further area not included in the predetermined area based on at least area size and population density at places of interest, scaling the model properties used for modelling of past mobility demand for the predetermined area to the further area for forming a domain-adapted model, and using the domain-adapted model for determining past mobility demand for the further area. Accordingly, the inventive method may be used for further areas for which no past mobility demand data is available and little knowledge of the characteristics of the further area. The adaptation factors enable scaling of an existing demand forecasting model for a given city to another city. For example, the population density of Las Vegas may be 1700/km², and 3275/km² for Los Angeles. Therefore, the scaling factor for the further are Las Vegas is roughly 0.5 compared to the area Los Angeles. Therefore, for Las Vegas half of mobility requests that we generate for LA (with the same user-group preferences) may be generated.

Although, in general other factors like area, urban population, traffic congestion, popularity scores etc. may also be used to generate more realistic scaling factors.

According to embodiments, modelling of past mobility demand may be performed based on continuously updated data received for a recent time period. Thus, the continuously updated data may be used together with a trained model of mobility demand for e.g. different regions, time stamps, etc.

According to embodiments, the method may include, for each transportation need request, providing a list of transportation options based on the pick-up coordinate and the drop-off coordinate, and travel preference attributes for the respective user group. The travel preference attributes may be price, brand of vehicle, mode of transport (cars, bikes, trams, trains, motorcycles etc.), time, in-car experience (e.g. infotainment and luxury options), safety scores of a particular route. Accordingly, an even more accurate distribution of the mobility units may be obtained which also accounts for travel preferences.

Moreover, the transportation option may be provided also based on traffic situation data and contextual information data regarding the predetermined area. The traffic situation data may provide information about e.g. bridge closure, obstruction due to on-going construction along a route, traffic jams, etc.

According to embodiments, the method may include selecting one of the transportation options based on user group transportation acceptance scores indicative of the preferred mode of transportation for the user group, wherein the selected transportation option is included in the transportation need request. Accordingly, comparing the user group transportation acceptance scores with the transportation options facilitates the selection of the transportation option and provides data driven acceptance models.

The user group transportation acceptance scores describe a distribution of the preferred transportation option for a user group.

According to further embodiments, adaptation factors for a further user group not included in the set of user groups may be calculated based on similarity scores between the region associated with the further user group and the region associated with a user group in the set of user groups, determining a user group activity preference and transportation preference based on the adaptation factors, and scaling the forecasted mobility demand based on the adaptation factors. For instance, for a given new area, user-group distributions may be compared with existing user-group distributions of all other areas. The similarity between two user group distributions may be evaluated using e.g. Kullback-Leibler divergence or Cosine similarity scores, based on factors like population density, culture preferences, income distributions, and ethnography/demography. Based on two similar areas scaling factors may be defined. For instance, downtown Los Angeles (Hollywood) may be similar to Las Vegas in terms of the hipster culture, purchasing power of people, tourism etc. However, the mobility demand for both regions differs because Las Vegas is smaller (in size and population) than Los Angeles.

The deep learning architecture may include supervised learning algorithms.

In some possible implementations, the deep learning algorithm may be a multi-layer convolutional neural network including optional recurrent or recursive layer in order to capture both spatial and temporal variations. The deep learning algorithm may also be related to Long Short Term Memory (LSTM) architecture. For instance, to provide a present mobility demand forecast may be based on solving a time series forecasting problem incorporating a spatial dimension.

The determining of User-group activity preference scores may be based on e.g. deep tensor-factorization techniques, Location Based Social Networks etc. Acceptance score generation may be based on choice modelling techniques such as the multinomial logit models or machine learning based approaches.

According to a second aspect of the invention, there is provided a computer program product including a computer readable medium having stored thereon computer program means for predicting a transportation demand in a predetermined area, the computer program product including: code for estimating a present mobility demand indicative of the number of pick-up demands at a present time stamp for each of a set of regions within the predetermined area based on modelling of past mobility demand, code for determining a set of activity preference scores indicative of the distribution of preferred activities at the present time stamp for each user group in a set of user groups, each region having an associated set of user groups, code for generating a pick-up coordinate query for each of the preferred activities for each user group and their respective region, code for generating a drop-off coordinate query for coordinates related to the preferred activities, code for, based on the queries and a stored set of coordinates for user groups and activities, determining a list of possible pick-up coordinate and drop-off coordinate combinations, code for generating a number of transportation need request based on the list of possible pick-up coordinate and drop-off coordinate combinations, and the estimated number of pick-up demands, each transportation need request include a time stamp, a pick-up coordinate, a drop-off coordinate, a user group, a pick-up venue category based on the pick-up coordinate, and a drop-off venue category based on the drop-off coordinate, and code for providing a signal indicative of the transportation need requests.

This second aspect of the invention provides similar advantages as discussed above in relation to the previous aspect of the invention. The method steps in embodiments of the first aspect may likewise be implemented with a code in the second aspect of the invention.

According to a third aspect of the invention, there is provided a system for predicting transportation demand in a predetermined area, the system includes: a demand forecasting module configured to estimate a present mobility demand indicative of the number of pick-up demands at a present time stamp for each of a set of regions within the predetermined area based on modelling of past mobility demand, a user activity preference profiler module for providing determining a set of activity preference scores indicative of the distribution of preferred activities at the present time stamp for each user group in a set of user groups, each region having an associated set of user groups, an demand activity mapping module configured to generate a pick-up coordinate query for each of the preferred activities for each user group and their respective region, and to generate a drop-off coordinate query for coordinates related to the preferred activities, a contextual map storage configured to receive the query, and, based on the query, provide a list of pick-up and drop-off coordinate combinations, a sampling module configured to generate a number of transportation need request based on the list of possible pick-up coordinate and drop-off coordinate combinations, and the estimated number of pick-up demands, each transportation need request include a time stamp, a pick-up coordinate, a drop-off coordinate, a user group, a pick-up venue category based on the pick-up coordinate, and a drop-off venue category based on the drop-off coordinate, and a control unit configured to generate a signal including the transportation need requests.

The signal including the transportation need requests may be used for distributing mobility units in the form of autonomous vehicles or human assisted self driving vehicles in the predetermined area.

The predetermined area may be a city.

The signal including the transportation need requests may be provided for further decision support tools, transportation simulation frameworks, or distributing mobility units in the form of autonomous vehicles or human assisted self driving vehicles in the predetermined area.

According to embodiments of the invention, the system may include a travel option recommender module configured to provide a list of transportation options for each of the pairs of pick-up coordinates and drop-off coordinates, a user group behavior module configured to provide user group travel preference attribute scores indicative of a distribution of preferred modes of transportation for the user groups, and a choice model module configured to select one of the listed transportation options from the travel option recommender module based on the user group travel preference attribute scores for every one of the transportation need requests, wherein the transportation option is included in the transportation need request signal.

This third aspect of the invention provides similar advantages as discussed above in relation to the above mentioned aspects of the invention.

In summary, the present invention relates to predicting transportation demand in a predetermined area, based on estimating a present mobility demand and based on user group preferences. Generated transportation need requests include at least a time stamp, a pick-up coordinate, a drop-off coordinate, a user group indication, a pick-up venue category based on the pick-up coordinate, and a drop-off venue category based on the drop-off coordinate. A signal indicative of the transportation need request is provided.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

These and other aspects of the present invention will now be described in more detail, with reference to the appended drawings showing example embodiments of the invention, wherein.

DETAILED DESCRIPTION OF EXEMPLARY EMBODIMENTS

In the present detailed description, various embodiments of the system and method according to the present invention are mainly described with reference to predicting a transportation demand in the form of transportation provided by mobility units in the form of autonomous vehicles. However, the present invention may equally well be used for package delivery systems, biking sharing distributions, city planning, public transportation planning, and on-demand mobility services for driving their business decisions or integrate it to primitive collaborative decision making systems, etc. Thus, this invention may be embodied in many different forms and should not be construed as limited to the embodiments set forth herein; rather, these embodiments are provided for thoroughness and completeness, and fully convey the scope of the invention to the skilled person. Like reference characters refer to like elements throughout.

Figure 1:
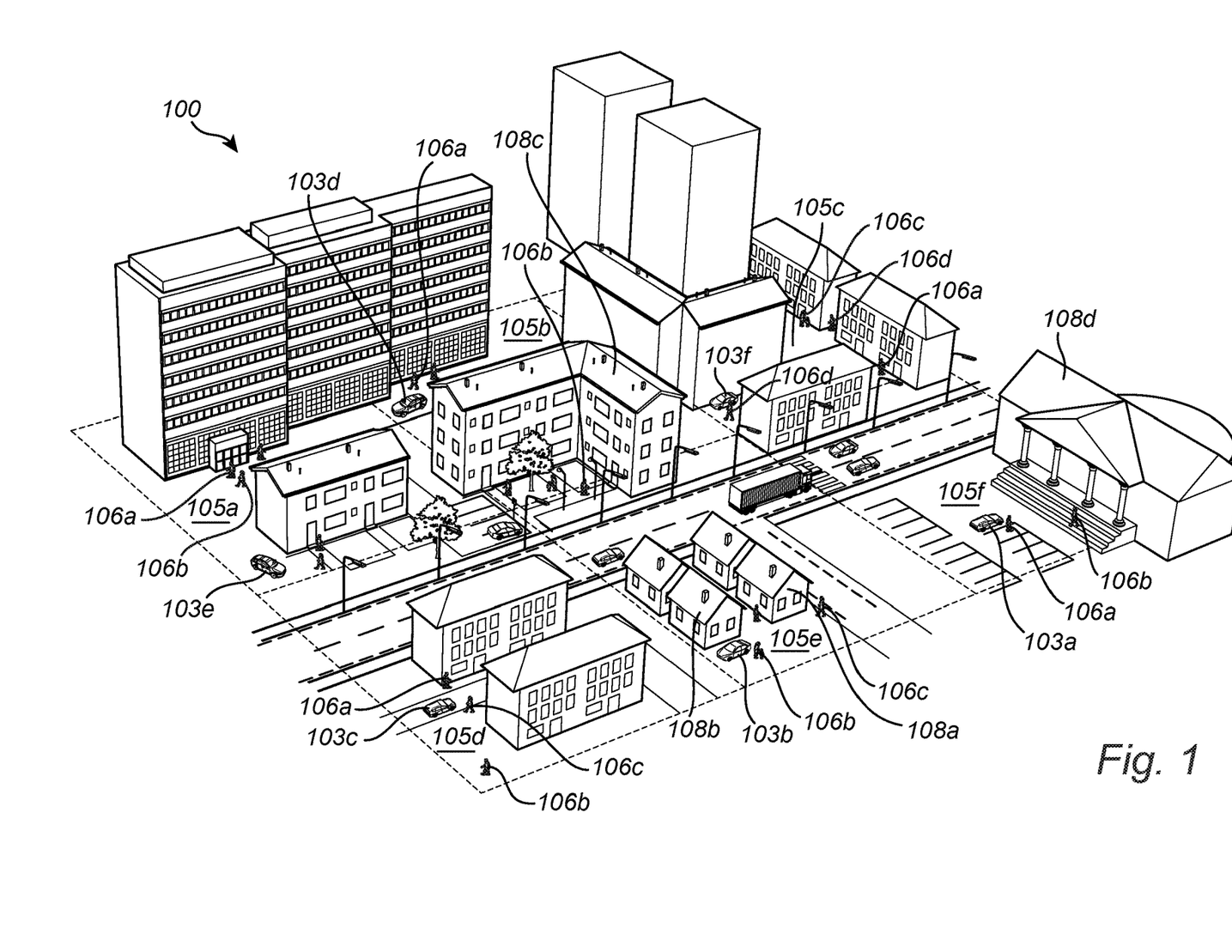
FIG. 1 conceptually illustrates an overview application of embodiments of the invention.

FIG. 1 conceptually illustrates application of the invention. In FIG. 1, a fleet of autonomous vehicles (or human assisted self driving vehicles) including the autonomous vehicles 103a, 103b, 103c, 103d, 103e, and 103f are operative in a predetermined area 100. Here, for clarity, only six vehicles are shown. However, the invention is applicable to any number of vehicles in a fleet, e.g. hundreds of vehicles.

The autonomous vehicles 103a-f operate in a predetermined area 100 including various agents such as places of interest (e.g. stadiums, museums, parks, etc.), cars, roads, road works, parking spaces, charging stations, bridges, tunnels, etc. The goals for the vehicles 103a-f are to provide mobility service to its customers.

The predetermined area 100 includes a plurality of regions 105a-f which may be defined by e.g. zip codes or taxi zones, or is user defined in some implementations. In each region, there are various user groups. For example, in region 105a the main user group 106a is students, and in region 105b the main user group 106b is seniors, and in region 105c one user group 106c having high income and one other a user group 106d is present. Here only a few user groups are shown for clarity. However, the invention is applicable to any number of user groups. In FIG. 1, each user group is represented by one person in order to not clutter the drawing. Each user group may of course include a large number of people.

Moreover, in the predetermined area 100 a number of venue are illustrated. The venues that are illustrated here in the presently described example are two restaurants 108a and 108b, a grocery store 108c, and a shopping mall 108d.

With the inventive concept, a present mobility demand indicative of the estimated number of pick-up demands at a present time stamp for each of the regions 105a-f within the predetermined area 100 is generated. Based on the preferred activities for the user groups 106a-d, and the locations of the venues 108a-c, the inventive concept predicts the transportation need in the predetermined area 100. It should be noted that the conceptual drawing FIG. 1 show exemplary distributions of venue categories and user groups. In practice, and within the scope of the claims, a different variety and number of user groups and venues may be possible, as well as a different number of regions.

It should be understood that although the example application conceptually shown in FIG. 1 relates to distribution of vehicles (one type of mobility unit) in the predetermined area, the invention is equally applicable to other applications. For instance the present invention may advantageously be used for city planning, OEMs in automotive industry, public transportation planning, and on-demand mobility services for driving their business decisions or integrate it to primitive collaborative decision making systems.

Figure 2:
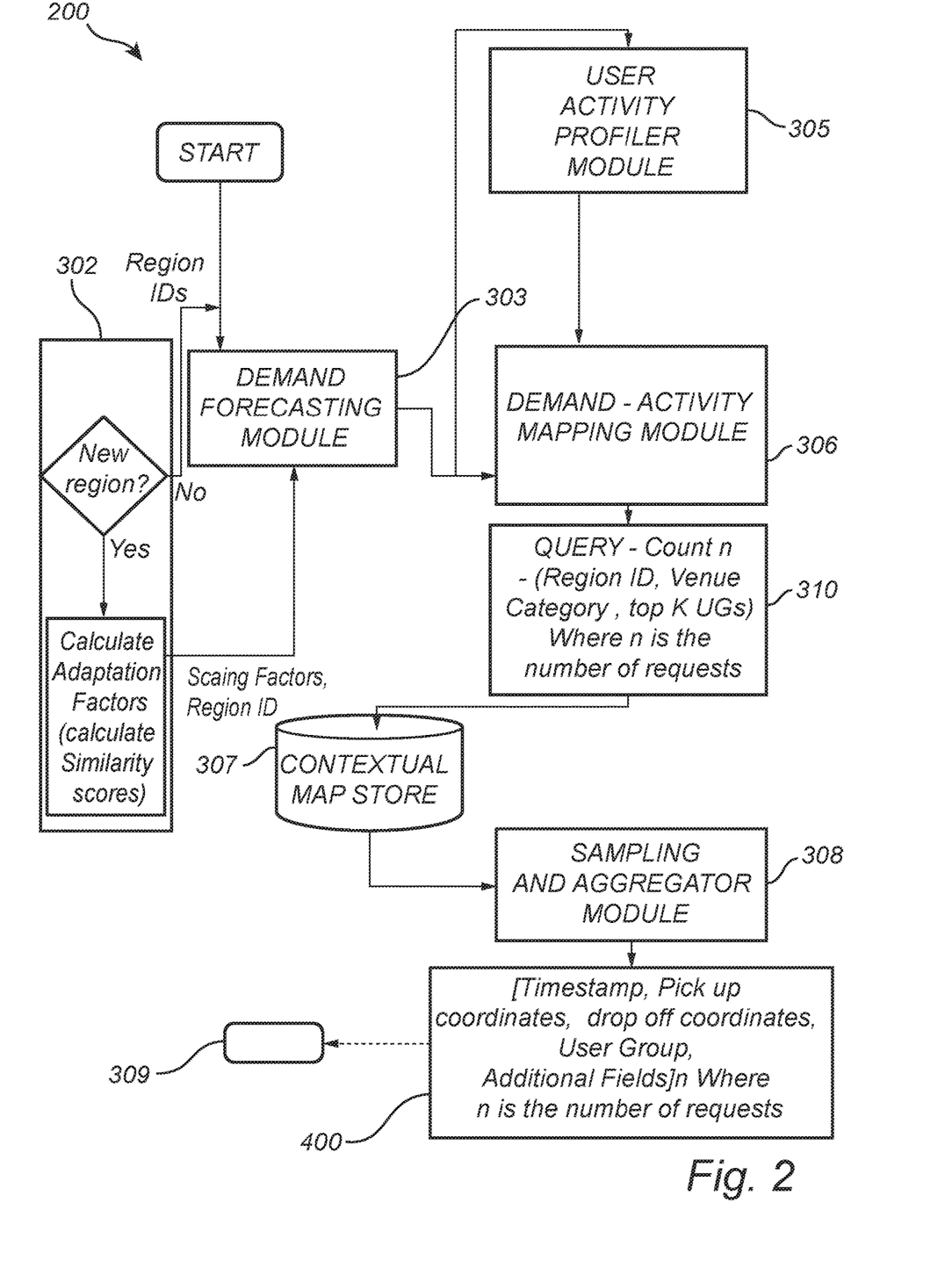
FIG. 2 conceptually shows a functional flow-chart in accordance with the inventive concept.

FIG. 2 illustrates a functional flow-chart a system 200 according to embodiments of invention. A demand forecasting module 303 is configured to estimate a present mobility demand indicative of the number of pick-up demands at a present time stamp for each of a set of regions 105a-f (see FIG. 1) within a predetermined area 100 based on modelling of past mobility demand.

The demand forecasting module 303 is trained with historical data from multiple sources. The multi-modality spans across various domains such as ethnography, check-in, weather data, mobility data, and behavioral or usage patterns.

During a training phase for the demand forecasting module 303, deep learning architectures may be employed to train mobility requests on mobility demand value. This process typically includes: pre-processing the historical data related to e.g. weather, traffic situations, events (e.g. concerts, holidays, etc.) into trainable format through e.g. big data pipelines, calculating mobility demand metric and deriving time series thereof, applying data transformation techniques and training a deep learning architecture on high performance computing platforms. Moreover, data related to context data (e.g. weather, traffic situations (e.g. intensity, bridge openings, etc), special events (concerts, holidays etc.)) may also be input to the training.

After training, in use, recent history of mobility demands time series along with context data are provided. This can be obtained from recent history of mobility demand time series. Then, absolute mobility demand forecast values are obtained from trained model for every region for a given time, hour, day of the week and other context data.

The demand forecasting module 303 has access to data indicative of historical transportation need and to data indicative of context data that may affect the transportation need in the predetermined area 100. The context data may be e.g. present weather, present traffic, special events (concerts, holidays etc.). When demand forecasting module 303 predicts the demand ahead of time (e.g. on an hourly basis) it is provided with the data indicative of historical transportation need and the data of the context data.

By applying trained models to the received data, demand forecast values are obtained from the trained model for every region 105a-f for a given time stamp.

Figure 3:
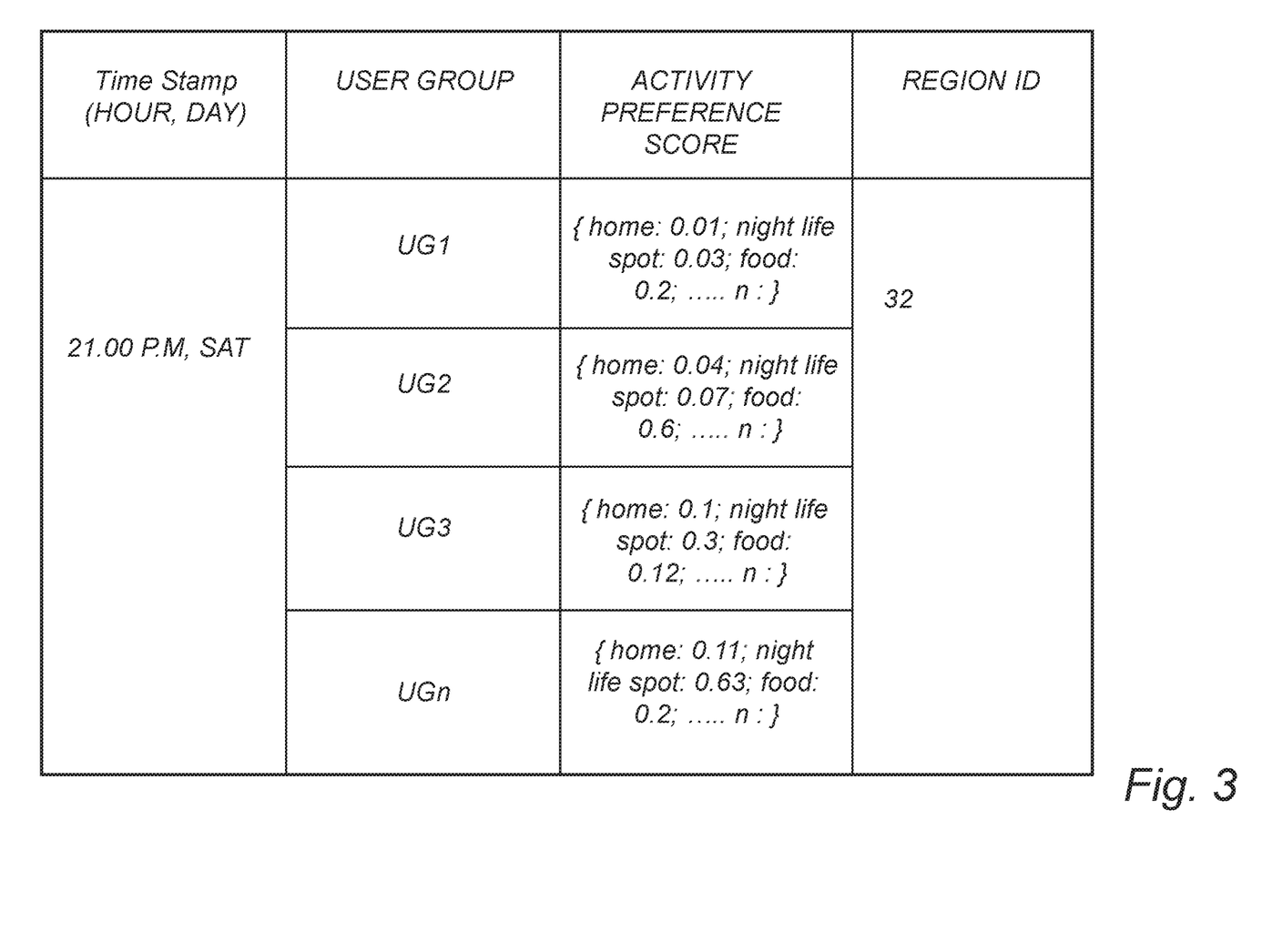
FIG. 3 illustrates an exemplary conceptual output from the user activity preference profiler module.

A user activity preference profiler module 305 is arranged for determining a set of activity preference scores indicative of the distribution of preferred activities at the present time stamp for each user group 106a-d in the regions 105a-f. An exemplary conceptual output from the user activity preference profiler module 305 is shown in FIG. 3 which is a table of user groups UG1-UGn, in a region 32, each of the user groups having an associated distribution of activity preference scores for various activates at the time stamp. One such output shown in FIG. 3 may be generated for each region 105a-f.

Now with further reference to FIG. 2, a demand activity mapping module 306 is configured to generate a query 310 for a pick-up coordinate for each of the preferred activities for each user group and their respective region, and a drop-off coordinate for coordinates related to the preferred activities. The demand activity mapping module 306 thus receives the output from the user activity preference profiler module 305 and matches it with the present estimated mobility demand from the demand forecasting module 303. The query also includes a request for the numbers of pick-up coordinates and drop-off coordinates that are requested, the number is equal to the present estimated mobility demand predicted by the demand forecasting module 303.

The demand activity mapping module 306 is further configured to identify the k most common user groups in each region, and their activity preference. For every activity, the query includes a request to identify GPS point coordinates with prominent user group presence that prefers the specific activity. In other words, GPS coordinates where it is likely to pick-up users that prefers the specific activity.

Further, the query includes a request for GPS coordinates that are tagged with a venue category that caters to the activity under question for determining drop-off coordinates.

A contextual map storage 307 is configured to receive the query, and based on the query, provide a list of pick-up and drop-off coordinate combinations. The data on the contextual map storage 307 may be cached or generated continuously, such that any change in tags of GPS coordinates may be taken into account for in real-time.

A sampling and aggregator module 308 is configured to generate a number of transportation need request based on the list of possible pick-up coordinate and drop-off coordinate combinations, and the estimated number of pick-up demands. Each transportation need request includes a time stamp, a pick-up coordinate, a drop-off coordinate, a user group 106a-d, a pick-up venue category based on the pick-up coordinate, and a drop-off venue category based on the drop-off coordinate. Thus, the sampling and aggregator module 308 samples, either randomly or using some statistical sampling such as weighted sampling schemes, the list of possible pick-up coordinate and drop-off coordinate combinations in order to generate the transportation need requests.

Figure 4:
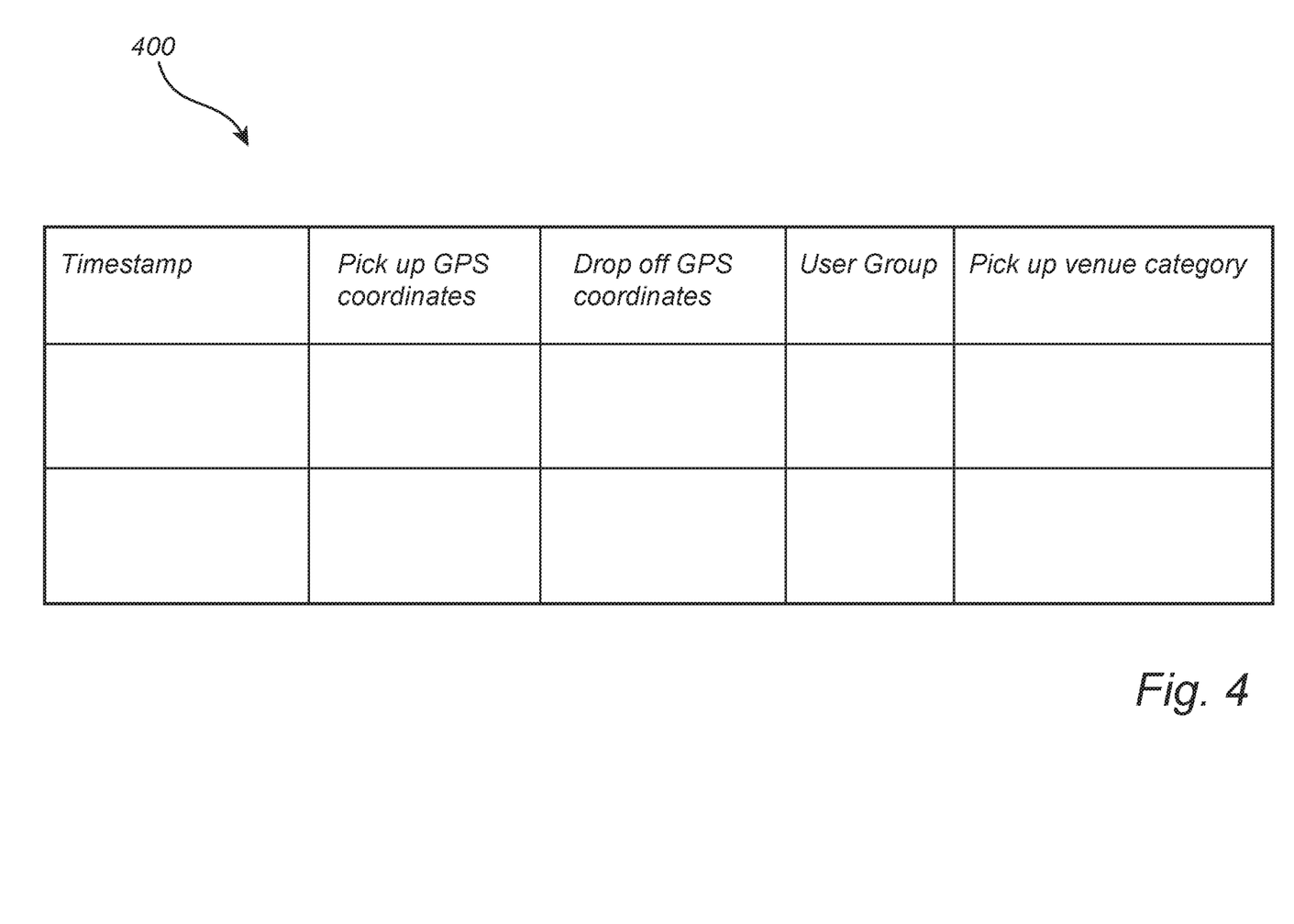
FIG. 4 conceptually shows a transportation need requests.

A conceptual transportation need requests 400 being output from the sampling and aggregator module 308 is shown in FIG. 4 in the form of a table including a time stamp, a pick-up coordinate, a drop-off coordinate, a user group 106a-d, a pick-up venue category based on the pick-up coordinate, and a drop-off venue category based on the drop-off coordinate.

The transportation need requests 400 may optionally be provided to a control unit 309 which is configured to distribute mobility units 103a-f in the predetermined area 100 according to the transportation need requests.

According to some embodiments, a domain adaptation module 302 may adapt the model used by the demand forecasting module to a new area not included in the predetermined area 100. The domain adaptation module 302 are configured for so called "transfer learning" in machine learning domain. If a new area is detected the domain adaptation module 302 calculates adaptation factors for the new area not included in the predetermined area based on at least area size and population density at places of interest in the predetermined area 100 and the new area. The domain adaptation module 302 may calculate similarity scores between a pair of areas and their regions. If the score is high, scaling factors are based on parameters such as area size, population densities at places of interest etc. The scaling factors are provided to the demand forecasting module for scaling its models. The new area may be either a new region for the predetermined area, or a completely new city not related to the predetermined area.

Figure 5:
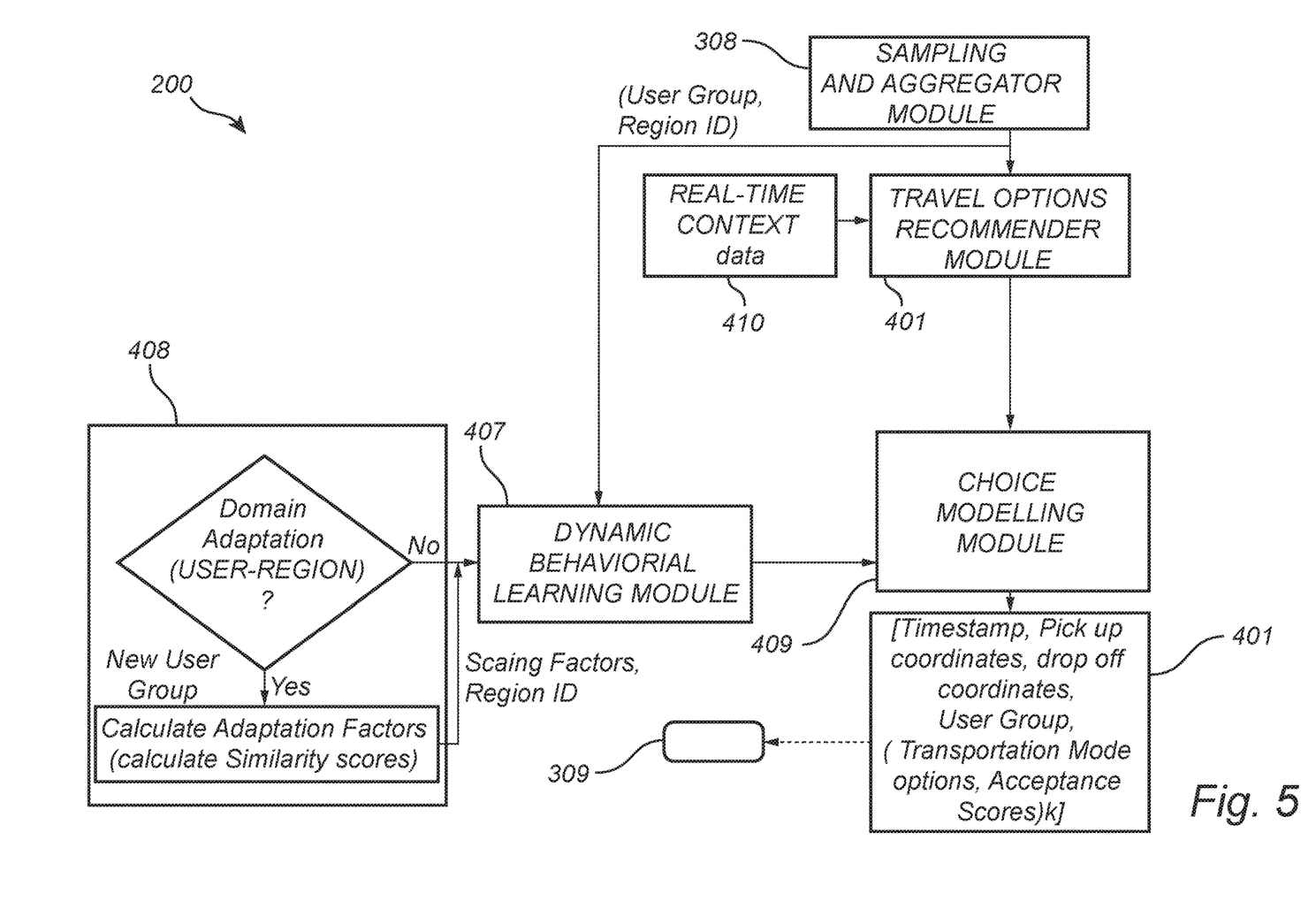
FIG. 5 conceptually shows a functional flow-chart in accordance with the inventive concept.

Now with reference to FIG. 5, showing a further function flow-chart including functional modules.

Figure 6:
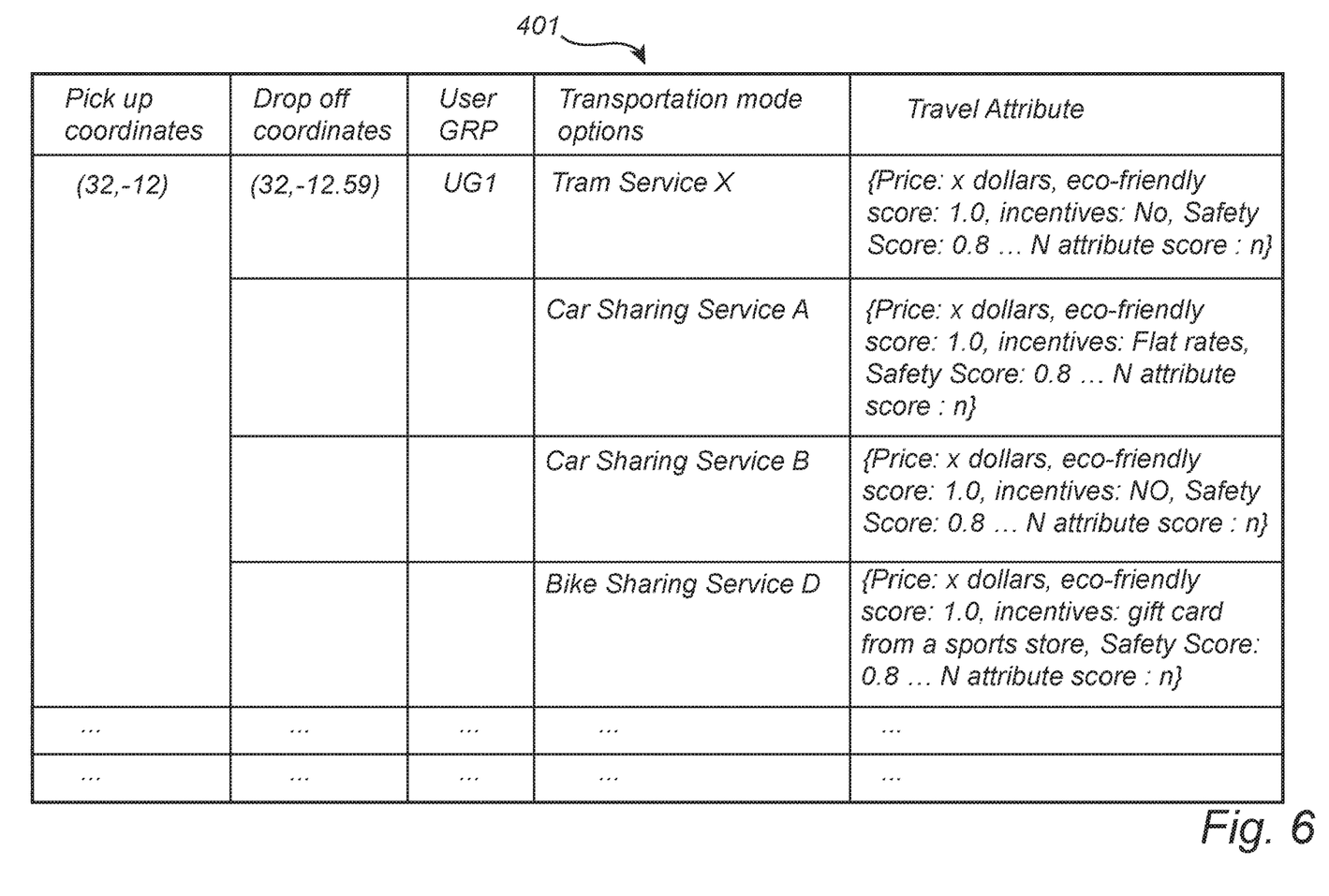
FIG. 6 illustrates an exemplary conceptual output from the travel option recommender module.

A travel option recommender module 401 may receive the output (see FIG. 2) from the sampling and aggregator module 308 which is also shown in FIG. 2. The travel option recommender module 401 is configured to provide a list of transportation options for each of the pairs of pick-up coordinates and drop-off coordinates. Each of the transportation options are associated with a plurality of travel preference attributes such as trip price, brand of vehicle, mode of transport (cars, bikes, trams, trains, motorcycles etc.), time, in-car experience (e.g. infotainment and luxury options), safety scores of a particular route, eco friendly score, etc. The table shown in FIG. 6 illustrates an exemplary output from the travel option recommender module 401.

Figure 7:
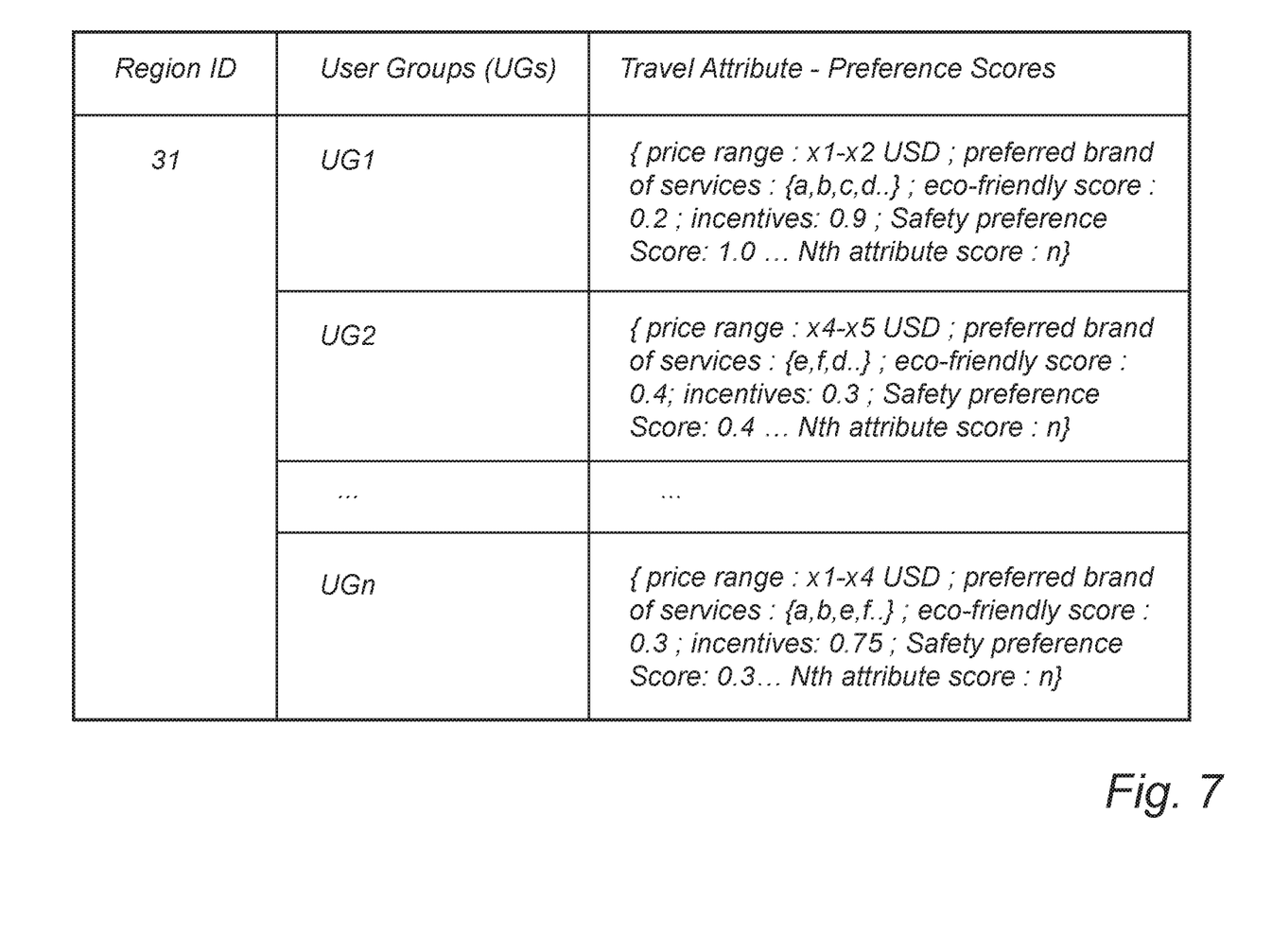
FIG. 7 illustrates an exemplary conceptual record in user group behavior module.

A dynamic user group behavior learning module 407 includes a storage (not shown) of user group travel preference attribute scores indicative of a distribution of preferred modes of transportation for various user groups. A conceptual record in user group behavior module 407 is illustrated in FIG. 7. The user preferences may change over time with context data such as special events, holidays, weather etc. The user group behavior module 407 is able to adapt to changing user group preferences.

Further, an optional user adaptation module 408 is a user-region domain adaptation module that identifies regions in another city, with similar user preferences based on similarity scores. This optional module 408 serves as useful feature for business/government entities to profile user groups and their travel preferences in new city/region place, thereby driving new policies. The user group behavior module 407 may also adapt the user travel attribute preference scores based on context data 410 such as special events, holidays, weather, traffic intensity, bridge openings, etc.

Additionally, in some embodiments is a choice modelling module 409 arranged to select one of the listed transportation options from the travel option recommender module 401 for every one of the transportation need requests 400. Thus, the outputs from the travel option recommender module 401 and user group behavior module 407 are received by the choice module 409, to select travel options based on acceptance score. Since every pick-up and drop-off locations have an associated user group (UG), the choice modelling module 409 calculates acceptance scores of all travel options based on user group preference at given point in time. The higher the acceptance score, the more likely a user group would prefer to select the respective travel option. The output from the choice modelling module 409 is a transportation need request 401 which includes the selected transportation options. Optionally, the transportation need request 401 is provided to a control unit 309 which is configured to distribute mobility units 103a-f in the predetermined area 100 according to the transportation need requests.

Figure 8:
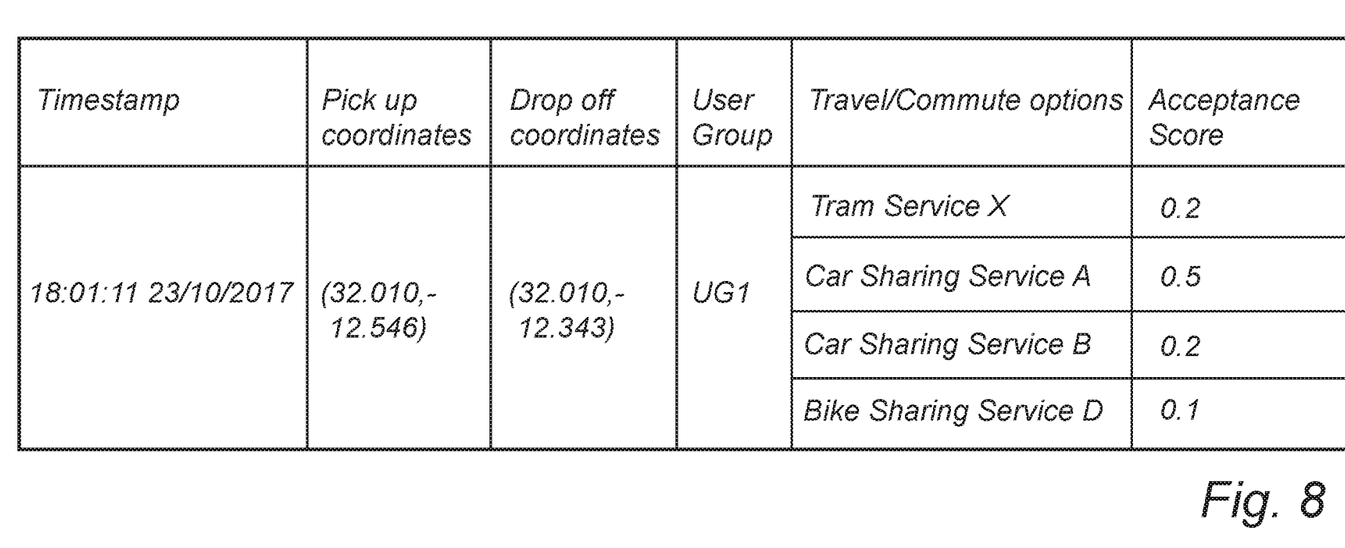
FIG. 8 illustrates a conceptual output from the choice module.

A conceptual output transportation need request 401 from the choice module is illustrated in FIG. 8.

Figure 9:
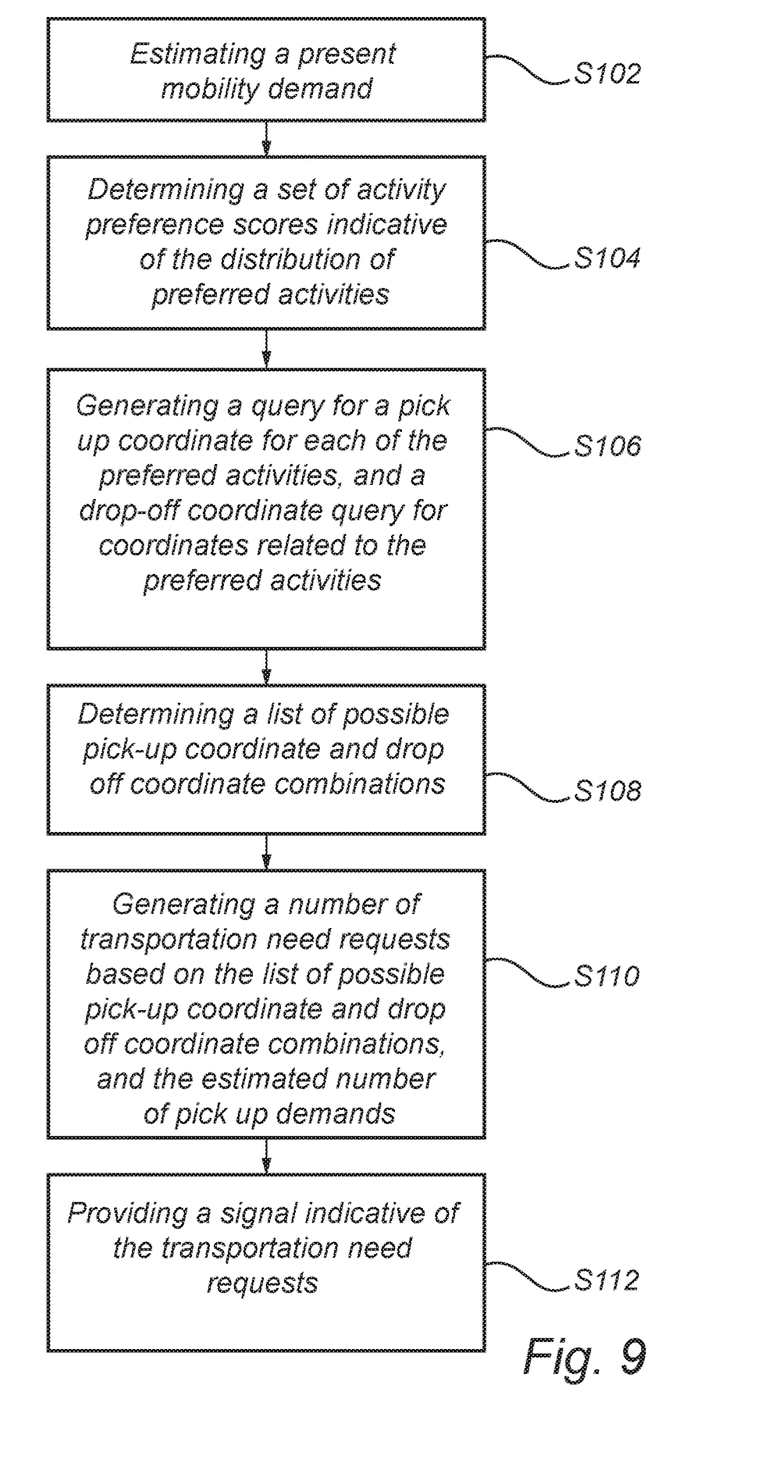
FIG. 9 is a flowchart of method steps according to embodiments of the invention.

FIG. 9 is a flow-chart of method steps according to embodiments of the invention. In step S102 is a present mobility demand estimated indicative of the estimated number of pick-up demands at a present time stamp for each of a set of regions within the predetermined area based on modelling of past estimated mobility demand. A set of activity preference scores is determined in step S104 indicative of the distribution of preferred activities at the present time stamp for each user group in a set of user groups, each region having an associated set of user groups. In a subsequent step S106 is a query generated for a pick-up coordinate for each of the preferred activities, and a drop-off coordinate query is generated for coordinates related to the preferred activities, for each user group and their respective region. Based on the query and a stored set of coordinates for user groups and activities, is a list of possible pick-up coordinate and drop-off coordinate combinations determined in step S108. In step S110 is a number of transportation need requests generated based on the list of possible pick-up coordinate and drop-off coordinate combinations, and the estimated number of pick-up demands. Each transportation need request include a time stamp, a pick-up coordinate, a drop-off coordinate, a user group, a pick-up venue category based on the pick-up coordinate, and a drop-off venue category based on the drop-off coordinate. In a subsequent step S112 is a signal indicative of the transportation need requests provided.

Figure 10:
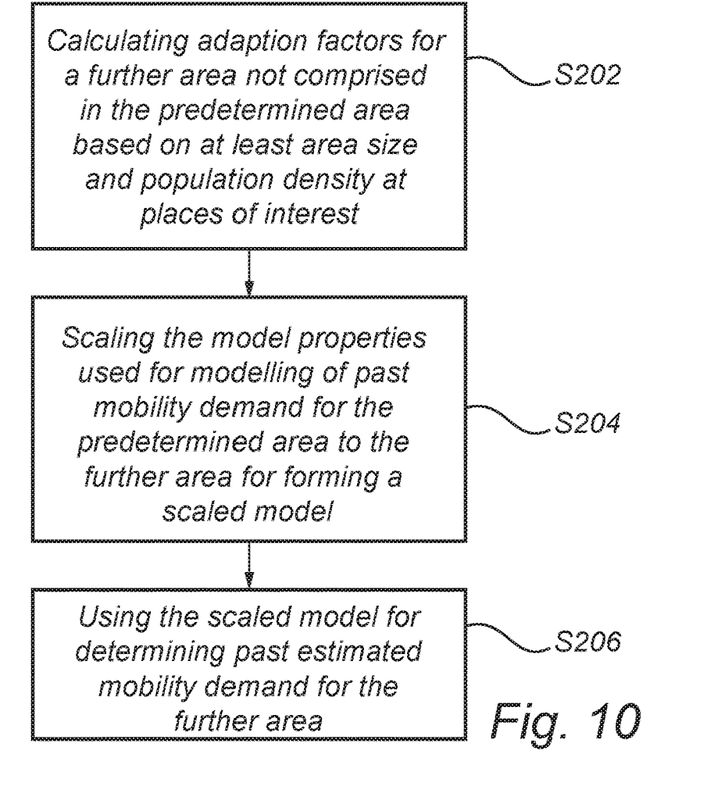
FIG. 10 is a flowchart of method steps according to embodiments of the invention.

FIG. 10 is a flow-chart of method steps that may precede the steps in FIG. 9. In step S202 are adaptation factors calculated for a further area not included in the predetermined area based on at least area size and population density at places of interest. The model properties used for modelling of past mobility demand for the predetermined area are scaled in step S204 to the further area for forming a domain-adapted model. Subsequently in step S206 is the domain-adapted model used for determining past estimated mobility demand for the further area.

Figure 11:
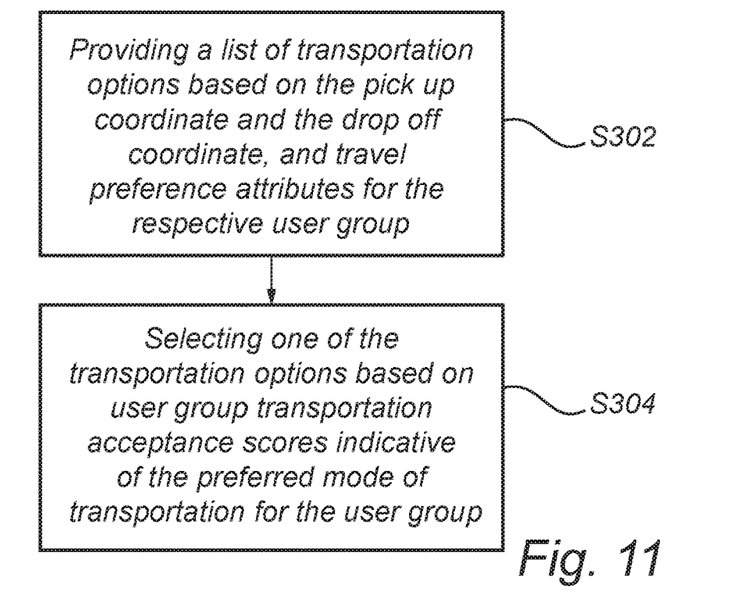
FIG. 11 is a flowchart of method steps according to embodiments of the invention.

FIG. 11 is another flow-chart of additional method steps according to embodiments of the invention. In step S302 is a list of transportation options provided based on the pick-up coordinate and the drop-off coordinate, and travel preference attributes for the respective user group. One of the transportation options is selected S304 based on user group transportation acceptance scores indicative of the preferred mode of transportation for the user group, wherein the selected transportation option is included in the transportation need request.

The system according to the inventive concept includes is a set of modules containing trained machine/deep learning modules, decision making modules, data storage to store required data, supervisory controls and other modules.

The control functionality of the present disclosure may be implemented using existing computer processors, or by a special purpose computer processor for an appropriate system, incorporated for this or another purpose, or by a hardwire system. Embodiments within the scope of the present disclosure include program products including machine-readable medium for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions. Moreover simulations or any processing may be carried out in a cloud-based infrastructure to evaluate multiple scenarios at large-scale.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

What is claimed is:

1. A system for controlling autonomous vehicles in a predetermined area, the system comprising:

a processor and a non-transitory computer readable storage medium storing instructions that, when executed by the processor, cause the system to:

estimate a present mobility demand indicative of the estimated number of pick-up demands at a present time stamp for each of a set of regions within the predetermined area by applying a trained model of the predetermined area to data indicative of historical transportation need and data indicative of context data that affects the transportation need in the predetermined area, determine a set of activity preference scores indicative of the distribution of preferred activities at the present time stamp for each user group in a set of user groups, each region having an associated set of user groups, generate a query for a pick-up coordinate for each of the preferred activities and a drop-off coordinate query for coordinates related to the preferred activities for each user group and their respective region by matching the set of activity preference scores with the estimated present mobility demand, predict transportation demand in the predetermined area, based on the queries and a stored set of coordinates for user groups and activities, by determining the list of possible pick-up coordinate and drop-off coordinate combinations, generate a number of transportation need requests based on the predicted transportation demand including the list of possible pick-up coordinate and drop-off coordinate combinations and the estimated number of pick-up demands at the present time stamp, wherein each transportation need request comprises at least a time stamp, a pick-up coordinate, a drop-off coordinate, a user group indication, is tagged with a pick-up venue category from a contextual map database based on the pick-up coordinate, and is tagged with a drop-off venue category from the contextual map database based on the drop-off coordinate, and control the autonomous vehicles based on the predicted transportation demand by causing the autonomous vehicles to distribute in the predetermined area based on the number of transportation need requests thereby simultaneously reflecting both historical mobility demand and expected user activity preferences, wherein the data indicative of the context data that affects the transportation need in the predetermined area includes the distribution of the preferred activities at the present time stamp for each user group in the set of user groups for each region having the associated set of user groups.

2. The system according to claim 1, wherein the instructions further cause the processor to select the estimated number of transportation need requests from the list of possible pick-up coordinate and drop-off coordinate combinations based on randomly selecting the estimated number of pick-up coordinate and drop-off coordinate combinations from the list.

3. The system according to claim 1, wherein the instructions further cause the processor to select the estimated number of transportation need requests from the list of possible pick-up coordinate and drop-off coordinate combinations based on weighted sampling of the estimated number of pick-up coordinate and drop-off coordinate combinations from the list.

4. The system according to claim 1, wherein the instructions further cause the processor to:
calculate adaptation factors for a further area not comprised in the predetermined area based on at least area size and population density at places of interest,
scale the model properties used for modelling of past mobility demand for the predetermined area to the further area for forming a domain-adapted model, and
use the domain-adapted model for determining past estimated mobility demand for the further area.

5. The system according to claim 1, wherein the modelling of past estimated mobility demand for forecasting the present mobility demand is performed based on deep learning architectures and context data.

6. The system according to claim 1, wherein modelling of past estimated mobility demand is performed based on continuously updated data received for a recent time period.

7. The system according to claim 1, wherein the instructions further cause the processor to:
for each transportation need request, provide a list of transportation options based on the pick-up coordinate and the drop-off coordinate, and travel preference attributes for the respective user group.

8. The system according to claim 7, wherein the instructions further cause the processor to provide the transportation options based on traffic situation data and contextual information data regarding the predetermined area.

9. The system according to claim 7, wherein the instructions further cause the processor to:
select one of the transportation options based on user group transportation acceptance scores indicative of the preferred mode of transportation for the user group, wherein the transportation need requests further includes the selected transportation option.

10. The system according to claim 9, wherein the instructions further cause the processor to adapt the user group transportation acceptance score based on context data affecting transportation properties.

11. The system according to claim 9, wherein the instructions further cause the processor to:
calculate adaptation factors for a further user group not comprised in the set of user groups based on similarity scores between the region associated with the further user group and the region associated with a user group in the set of user groups,
determine a user group activity preference and transportation preference, based on the adaptation factors, and
scale the forecasted mobility demand based on the adaptation factors.

12. The system according to claim 1, wherein the plurality of autonomous vehicles comprise a plurality of autonomous vehicles distributed about the predetermined area responsive to the signal indicative of the transportation need requests to meet the transportation need requests at the present time stamp.

13. A computer program product comprising a non-transitory computer readable medium having stored thereon instructions for causing a processor to control autonomous vehicles in a predetermined area, the computer program product comprising:
instructions causing the processor to estimate a present mobility demand indicative of the number of pick-up demands at a present time stamp for each of a set of regions within the predetermined area by applying a trained model of the predetermined area to data indicative of historical transportation need and data indicative of context data that affects the transportation need in the predetermined area,
instructions causing the processor to determine a set of activity preference scores indicative of the distribution of preferred activities at the present time stamp for each user group in a set of user groups, each region having an associated set of user groups,
instructions causing the processor to generate a pick-up coordinate query for each of the preferred activities for each user group and their respective region by matching the set of activity preference scores with the estimated present mobility demand,
generating a drop-off coordinate query for coordinates related to the preferred activities, and
instructions causing the processor to predict transportation demand in the predetermined area, based on the queries and a stored set of coordinates for user groups and activities, by determining a list of possible pick-up coordinate and drop-off coordinate combinations,
instructions causing the processor to generate a number of transportation need requests based on the predicted transportation demand including the list of possible pick-up coordinate and drop-off coordinate combinations and the estimated number of pick-up demands, wherein each transportation need request comprises a time stamp, a pick-up coordinate, a drop-off coordinate, a user group indication, is tagged with a pick-up venue category from a contextual map database based on the pick-up coordinate, and is tagged with a drop-off venue category from the contextual map database based on the drop-off coordinate, and
instructions causing the processor to control the autonomous vehicles based on the predicted transportation demand by causing the autonomous vehicles to distribute in the predetermined area based on the number of transportation need requests thereby simultaneously reflecting both historical mobility demand and expected user activity preferences, wherein the data indicative of the context data that affects the transportation need in the predetermined area includes the distribution of the preferred activities at the present time stamp for each user group in the set of user groups for each region having the associated set of user groups.

14. The computer program product according to claim 13, wherein the plurality of autonomous vehicles comprise a plurality of autonomous vehicles distributed about the predetermined area responsive to the signal indicative of the transportation need requests to meet the transportation need requests at the present time stamp.

15. A system for controlling autonomous vehicles in a predetermined area, the system comprising:

a demand forecasting module comprising instructions stored in a memory and executed by a processor to cause the processor to estimate a present mobility demand indicative of the number of pick-up demands at a present time stamp for each of a set of regions within the predetermined area by applying a trained model of the predetermined area to data indicative of historical transportation need and data indicative of context data that affects the transportation need in the predetermined area, a sampling module comprising instructions stored in the memory and executed by the processor to cause the processor to:

determine a set of activity preference scores indicative of the distribution of preferred activities at the present time stamp for each user group in a set of user groups, each region having an associated set of user groups, generate a pick-up coordinate query for each of the preferred activities for each user group and their respective region and a drop-off coordinate query for coordinates related to the preferred activities by matching the set of activity preference scores with the estimated present mobility demand, and predict transportation demand in the predetermined area, based on the queries, by providing a list of pick-up and drop-off coordinate combinations, generate a number of transportation need request based on the predicted transportation demand including the list of possible pick-up coordinate and drop-off coordinate combinations and the estimated number of pick-up demands, wherein each transportation need request comprises a time stamp, a pick-up coordinate, a drop-off coordinate, a user group indication, is tagged with a pick-up venue category from a contextual map database based on the pick-up coordinate, and is tagged with a drop-off venue category from the contextual map database based on the drop-off coordinate, and a control unit configured to:

control the autonomous vehicles based on the predicted transportation demand by causing the autonomous vehicles to distribute in the predetermined area based on the number of transportation need requests thereby simultaneously reflecting both historical mobility demand and expected user activity preferences, wherein the data indicative of the context data that affects the transportation need in the predetermined area includes the distribution of the preferred activities at the present time stamp for each user group in the set of user groups for each region having the associated set of user groups.

16. The system according to claim 15, wherein the signal comprising the transportation need requests is provided for further decision support tools, transportation simulation frameworks, or distributing autonomous vehicles in the form of autonomous vehicles or human assisted self-driving vehicles in the predetermined area.

17. The system according to claim 15, further comprising:

a travel option recommender module comprising instructions stored in the memory and executed by the processor to cause the processor to provide a list of transportation options for each of the pairs of pick-up coordinates and drop-off coordinates, a user group behavior module comprising instructions stored in the memory and executed by the processor to cause the processor to provide user group travel preference attribute scores indicative of a distribution of preferred modes of transportation for the user groups, and a choice model module comprising instructions stored in the memory and executed by the processor to cause the processor to select one of the listed transportation options from the travel option recommender module based on the user group travel preference attribute scores for every one of the transportation need requests, wherein the transportation option is included in the transportation need request signal.

* * * * *